US012396912B2

(12) United States Patent
Aquilante et al.

(10) Patent No.: US 12,396,912 B2
(45) Date of Patent: Aug. 26, 2025

(54) LOAD COMPENSATION DEVICE, IN PARTICULAR OF GRAVITATIONAL LOADS, APPLICABLE TO EXOSKELETONS

(71) Applicant: AGADE, S.R.L., Milan (IT)

(72) Inventors: Lorenzo Aquilante, Treglio (IT); Mattia Tabaglio, Inveruno (IT); Daniele Ramirez, Genoa (IT); Francesco Braghin, Varese (IT); Alessandra Laura Giulia Pedrocchi, Segrate (IT); Marta Gandolla, Gavirate (IT); Stefano Dalla Gasperina, Cesiomaggiore (IT)

(73) Assignee: AGADE, S. R. L., Milan (IT)

( * ) Notice: Subject to any disclaimer, the term of this patent is extended or adjusted under 35 U.S.C. 154(b) by 833 days.

(21) Appl. No.: 17/615,306

(22) PCT Filed: May 29, 2020

(86) PCT No.: PCT/EP2020/064944
§ 371 (c)(1),
(2) Date: Nov. 30, 2021

(87) PCT Pub. No.: WO2020/245038
PCT Pub. Date: Dec. 10, 2020

(65) Prior Publication Data
US 2022/0218552 A1    Jul. 14, 2022

(30) Foreign Application Priority Data
Jun. 3, 2019   (IT) .................. 102019000007848

(51) Int. Cl.
*A61H 1/02*        (2006.01)
*A61H 3/00*        (2006.01)
(Continued)

(52) U.S. Cl.
CPC ............ *A61H 1/0281* (2013.01); *A61H 1/024* (2013.01); *A61H 1/0244* (2013.01); *A61H 3/00* (2013.01);
(Continued)

(58) Field of Classification Search
CPC .... B25J 9/0006; A61H 3/00; A61H 2201/165; A61H 1/024; A61H 2201/5064; A61H 2201/123; A61H 1/0281; A61H 1/0244
See application file for complete search history.

(56) References Cited

U.S. PATENT DOCUMENTS 5,402,690 A      4/1995   Sekiguchi et al.
2006/0241539 A1  10/2006  Agrawal et al.
(Continued)

FOREIGN PATENT DOCUMENTS

CA    2544645    10/2006
CA    2952403    6/2017
(Continued)

OTHER PUBLICATIONS

Translation of WO 2019/057797 (Year: 2019).*
Translation of DE 10238256 (Year: 2004).*

*Primary Examiner* — Brian E Pellegrino
(74) *Attorney, Agent, or Firm* — ALLEN, DYER, DOPPELT, + GILCHRIST, P.A. Attorneys at Law (57) ABSTRACT

A load compensation device may include an assisted joint configured to be constrained to a support structure; a main rod comprising a proximal end connected to the assisted joint, and further comprising a distal end configured to be stressed by an applied load; an auxiliary rod comprising a first end and a second end, the first end being hinged on the main rod for rotating the auxiliary rod with respect to the main rod, the second end being movable on a plane on which the applied load lies; an elastic element configured to provide an elastic force which acts between the second end (Continued)

of the auxiliary rod and the distal end of the main rod; a regulation system configured to modify a distance between the second end of the auxiliary rod and the assisted joint, so as to vary a preloading of the elastic element.

14 Claims, 5 Drawing Sheets

(51) Int. Cl.
*B25J 9/00* (2006.01)
*B25J 19/00* (2006.01)

(52) U.S. Cl.
CPC ......... *B25J 9/0006* (2013.01); *B25J 19/0016* (2013.01); *A61H 2201/1215* (2013.01); *A61H 2201/165* (2013.01); *A61H 2201/5058* (2013.01); *A61H 2201/5064* (2013.01)

(56) References Cited

U.S. PATENT DOCUMENTS

| | | |
|---|---|---|
| 2012/0184880 A1 | 7/2012 | Doyle |
| 2015/0231018 A1 | 8/2015 | Shim et al. |

FOREIGN PATENT DOCUMENTS

| | | | | |
|---|---|---|---|---|
| CN | 102471043 | | 5/2012 | |
| CN | 105234959 | | 1/2016 | |
| CN | 105722490 A | * | 6/2016 | ............ A61H 1/024 |
| CN | 205915355 | | 2/2017 | |
| CN | 109070336 | | 12/2018 | |
| DE | 10238256 A1 | * | 3/2004 | ........... A61F 5/0102 |
| EP | 2861387 | | 4/2015 | |
| EP | 3278938 | | 2/2018 | |
| EP | 3342390 | | 7/2018 | |
| EP | 3673884 | | 7/2020 | |
| JP | 2018140475 | | 9/2018 | |
| KR | 20120082221 | | 7/2012 | |
| KR | 20160071661 | | 6/2016 | |
| TW | 201226010 | | 7/2012 | |
| WO | 2013186701 | | 12/2013 | |
| WO | 2015106278 | | 7/2015 | |
| WO | 2015147584 | | 10/2015 | |
| WO | 2017161257 | | 9/2017 | |
| WO | 2018165399 | | 9/2018 | |
| WO | 2018213363 | | 11/2018 | |
| WO | WO-2019057797 A1 | * | 3/2019 | ........... A61H 1/0262 |

* cited by examiner

LOAD COMPENSATION DEVICE, IN PARTICULAR OF GRAVITATIONAL LOADS, APPLICABLE TO EXOSKELETONS

TECHNICAL FIELD

The present invention relates to a load compensation device, in particular for compensating gravitational loads. In a preferred and non-limiting application, the present invention also relates to a related exoskeleton.

In general, the present invention finds non-limiting applications in the field of handling apparatuses and in the field of physical activity and rehabilitative exercise apparatuses.

PRIOR ART

In the last years, exoskeletons have found various applications which are mostly related to the biomedical and industrial fields.

In the biomedical field, the exoskeletons are designed to enhance the individual's physical and motor abilities, further compensating the effect of the force of gravity thus reducing the physical effort and the individual exertion. In particular, in the biomedical field, exoskeletons are used in the field of motor function recovery and assistance. The recovery relates to the rehabilitation of a patient, while the "assistance" relates to the simple case of aid, wherein the motor abilities of a user are irreversibly compromised.

In the industrial field, exoskeletons are mainly used in the manufacturing and building industries, in which the operators have to maintain uncomfortable postures or have to move or lift heavy loads; furthermore, exoskeletons are also used as aid for the healthcare workers. In general, in this industrial field, the exoskeleton is designed to relieve the effort of one or more body parts.

In exoskeletons, the load compensation is carried out via different technologies which can be categorized as "passive" or "active": the "passive" compensation technology uses a set of one or more elastic elements, which are loaded during the motion and release deformation energy during a motion in opposite direction; instead, the "active" compensation technology uses a motor-driven drive, typically of the electric type; other types of drives can provide piezoelectric actuators, SMA ("Shape-Memory Alloys"), pneumatic drives or electroactive polymers.

The passive compensation technology has the advantage of not requiring an external power supply, allowing lighter, more compact exoskeletons, which are also free from electronic power supply, to be obtained. Indeed, the passive compensation systems usually consist of kinematic chains of elastic elements, which support by deformation the user's weight.

However, exoskeletons with passive compensation cannot apply total compensation to the loads, for any position taken by the user, but have only one balance point. Furthermore, during the loading motion, the user has to produce force in order to load the elastic elements.

Instead, the active compensation technology requires an external power supply, electronics and control logics. Disadvantageously, the electric drive motors are bulky, causing the exoskeleton to be heavier and less ergonomic than the passive one. Furthermore, in case of high energy consumptions, the exoskeleton cannot be efficiently powered by a light and compact battery system.

For these reasons, the most widespread exoskeletons are of the passive compensation type both in the industrial field and in the biomedical field.

Examples of exoskeleton systems and gravitational load compensation devices of the active type are provided in documents KR20160071661, EP3278938A1, WO2017161257 and WO2015106278, which describe solutions including actuators.

Examples of exoskeleton systems and gravitational load compensation devices of the passive type are provided in documents KR20120082221, WO2015147584, CA2952403, US20120184880, CA2544645, WO2018165399A1, EP2861387, which include elastic elements, also of the adjustable type, proposed in exoskeletons and in devices which are wearable by a user.

A further example of gravitational load compensation device is provided in document EP3342390A1, which refers to an apparatus to support a limb comprising passive force elements connected to a wearable element and support active elements actuated by traction actuators with motor-driven cable. However, also the device known from EP3342390A1, although realizing a hybrid structure between active and passive systems, has disadvantages and limitations of application.

SUMMARY OF THE INVENTION

Object of the present invention is to solve drawbacks of the prior art.

Further particular object of the present invention is to present a device which has reduced energy consumptions and can thus efficiently be power supplied also with a portable battery system.

Further particular object of the present invention is to allow variable load compensation, in particular of gravitational loads, for any position taken by the user.

Further particular object of the present invention is to present a device which is less bulky than those entirely active, so as to obtain lighter and more ergonomic exoskeletons.

These and other objects are achieved by a load compensation device and a related exoskeleton according to features of the appended claims, which form an integral part of the present description.

An idea underlying the present invention is to provide a load compensation device comprising:
  an assisted joint configured to be constrained to a support structure;
  a main rod comprising a proximal end connected to the assisted joint, and further comprising a distal end configured to be stressed by an applied load;
  an auxiliary rod comprising a first end and a second end, the first end being hinged on the main rod for rotating the auxiliary rod with respect to the main rod, and the second end being movable on a plane on which the applied load lies;
  an elastic element configured to provide an elastic force which acts between the second end of the auxiliary rod and the distal end of the main rod;
  a regulation system configured to modify a distance between the second end of the auxiliary rod and the assisted joint, so as to vary a preloading of the elastic element;
  wherein the elastic element is configured to provide the elastic force based on a kinematic configuration of the load compensation device, so as to compensate the applied load in a component thereof which is transverse to the main rod.

In short, the load compensation device according to the present invention is designed with the purpose to completely identify and compensate, with minimal energy consumptions and bulkiness, the effect of a force, for example of a gravitational force, which acts on a main rod which represents the hooking point of the load compensation device to a structure of a system in which it is inserted, for example of an exoskeleton or of a robotic arm.

The load compensation device of the present invention then comprises a mechanical structure provided with suitable sensors and control logics, wherein a preloaded elastic element provides the necessary compensation force.

Advantageously, the present invention allows realizing a load compensation device which realizes a hybrid technology, designed to apply a compensation of the loads which adapts to the movements of the user, while guaranteeing a high compactness and low energy consumptions.

In particular, the load compensation device according to the present invention allows merging the positive aspects of the passive and active technologies inside a unique device which can be scalable to any type of apparatus or exoskeleton.

The load compensation device according to the present invention can also advantageously be used in different fields, such as for example the industrial robotics, the lifting or handling systems, to develop more compact and less energy-consuming apparatuses.

Preferably, the load compensation device comprises a movable regulation element, associated with the support structure. In particular, preferably, the movable regulation element provides a regulation rod and linear actuator system, or a cable and motor-driven pulley system.

Preferably, the elastic element is at least indirectly connected to the second end of the auxiliary rod. In particular, preferably, the load compensation device comprises a compensating cable which connects the second end of the auxiliary rod to the elastic element, with a pulley in proximity of the distal end of the main rod.

The load compensation device, which is the object of the present invention, could be applied to one or more joints of an exoskeleton or a robotic arm, making the solution applied to multiple degrees of freedom.

A further idea underlying the present invention is thus to provide an exoskeleton comprising one or more load compensation devices.

Further characteristics and advantages will be more evident from the detailed description made hereinafter, of preferred non-limiting embodiments of the present invention and from the dependent claims, which are outlining preferred and particularly advantageous embodiments of the invention.

BRIEF DESCRIPTION OF THE DRAWINGS

The invention is illustrated with reference to the following figures, provided by way of a non-limiting examples, wherein.

In different figures, similar elements will be identified by similar reference numbers.

DETAILED DESCRIPTION

In preferred embodiments, the load compensation device according to the present invention is used for compensating the effect of gravitational loads in exoskeletons or robotic arms. In particular, the present invention is pertaining to exoskeletons applicable to multiple joints of the human body, such as shoulder, hip in favor of the lumbar spine, the knee, and to robotic arms. The present invention will refer to this non-limiting application of the load compensation device according to the present invention.

In this exemplary application, most of the effort required to carry out a movement with the upper limbs is used to overcome the gravitational effect which can be identified with a torque which acts on the arm itself. Accordingly, the shoulder is the joint which is mainly stressed. The exoskeletons are devices designed exactly to relieve the effort of the user who is wearing it, multiplying the force capabilities. In particular, the load compensation device according to the present invention is designed to be integrated inside exoskeletons, for upper limbs or also lower limbs, at a joint of a user. Similar applications can be carried out, by extension, to robotic arms.

Figure 1:
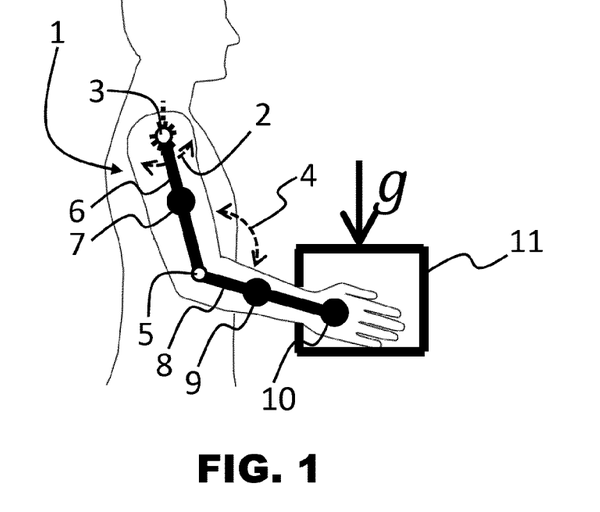
FIG. 1 illustrates an example of an upper limb which holds an object subjected to a load induced by gravitational force.

FIG. 1 illustrates an example of an upper limb 1 which holds an object 11 subjected to a load induced by the gravitational acceleration "g".

The load "g" which acts on the object 11 becomes particularly relevant for the flexo-extension movement of the shoulder of the limb 1: this is the case of the "pick & place" movement which is carried out in many industrial fields, such as in the one of large retailer logistic and of manufacturing.

The limb 1 can be schematized as being composed of rigid bodies 6 and 8, of load 11 and of masses 7, 9, 10 and 11, respectively. The rods 6 and 8 are connected with each other by a hinge 5 and constrained to the ground via a hinge 3. This system represents the scheme of the user in the vertical plane. Therefore, the compensation torque applied to the body 6, which is necessary to compensate the gravitational effect which acts on the system and which is caused by the gravitational acceleration "g", will be in function of the position thereof taken in the plane, identified by the angles 2 and 4, by the geometric values of the rods 6 and 8 and by the corresponding masses 7, 9, 10 and 11. The gravitational effect can thus be understood as a resulting torque on the rod 6 caused by the weight forces acting on the barycentres of the bodies 7, 9, 10 and 11.

Figure 2:
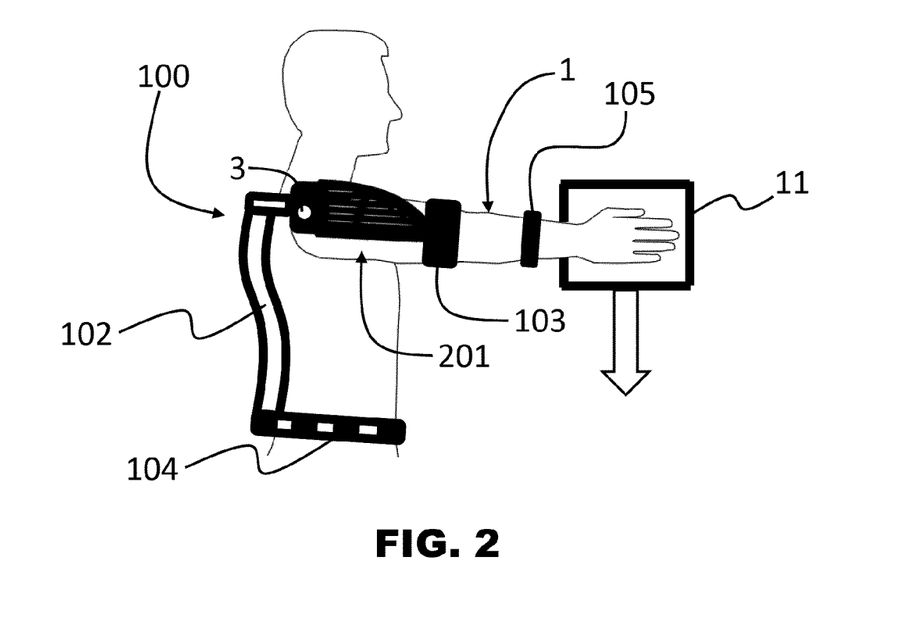
FIG. 2 illustrates an exoskeleton engaging an upper limb and comprising a load compensation device according to the present invention.

FIG. 2 illustrates an exoskeleton 100 engaging the upper limb 1 and comprising a load compensation device 201 according to the present invention.

As already described, a non-limiting example of application of the present invention is the compensation of gravitational loads acting on upper limbs during the flexo-extension motion of the shoulder, that is the rotation motion of the shoulder in the vertical plane, as already illustrated in FIG. 1, where the arrow 2 represents the rotation of the shoulder and "g" the gravity vector. In this case, the exoskeleton 100 is configured to compensate the gravitational loads which the shoulder of the user is subjected to.

The application of the load compensation device 201 to the exoskeleton 100 is exemplified to provide a hybrid technology in the case of exoskeletons for upper limbs and for "pick & place" activities.

The load compensation device 201 is connected to a support structure 102 onto which the forces are released. The compensation force is transferred from the device 201 to the limb via an armrest 103 during the flexo-extension motion of the shoulder which is imposed by the user around the hinge 3. The belt 104 preferably contains the electronic components and the power-supply batteries of all active parts, while the strip 105 contains a sensor for detecting the relative rotation between arm and forearm.

In general, the load compensation device is associated, in the exoskeleton 100, with a battery to supply power to the regulation system, which will be further described, with a plurality of sensors and with at least a processor.

In other embodiments, the load compensation device could be applied to a robot or to a lifting apparatus or to a load handling apparatus, with an assisted joint configured to be constrained to a support structure, where there is a main rod, with the purpose of compensating a transverse component of a load applied to the main rod.

Figure 3:
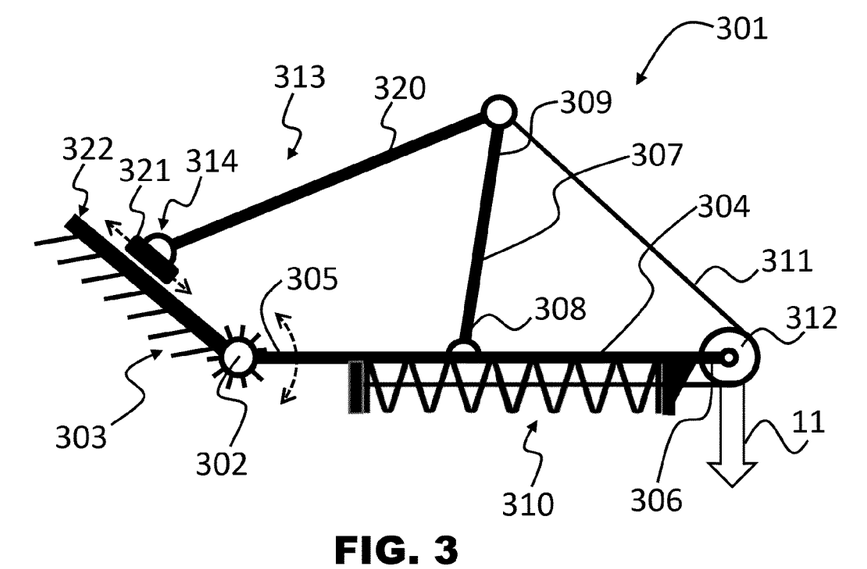
FIG. 3 illustrates a first embodiment of a load compensation device according to the present invention.

FIG. 3 illustrate a first embodiment of a load compensation device 301 according to the present invention.

The load compensation device 301, which is in particular configured to compensate gravitational loads, comprises an assisted joint 302, which is configured to be constrained to a support structure 303.

The load compensation device 301 further comprises a main rod 304 comprising a proximal end 305 connected to the assisted joint 302, and further comprising a distal end 306 configured to be stressed by the applied load, for example the already-described load 11.

The load compensation device 301 further comprises an auxiliary rod 307 comprising a first end 308 and a second end 309. The first end 308 is hinged on the main rod 304 for rotating of the auxiliary rod 307 with respect to the main rod 304. The second end 309 is instead movable on a plane on which the applied load 11 lies, which the load compensation device 301 is configured to compensate.

In particular, the auxiliary rod 307 is projecting outside of the main rod 304 in a direction opposite to a prevalent direction of the applied load 11. In particular, in the exemplary configuration of FIG. 3, the main rod 304 is horizontal and the auxiliary rod 307 is projecting outside of the main rod 304 in an essentially vertical and "upwards" direction, therefore on the opposite side of the prevalent direction of the applied load 11 which is "downwards".

Preferably, the first end 308 of the auxiliary rod 307 is hinged on the main rod 304 in an intermediate position between the proximal end 305 and the distal end 306 of the main rod 304.

In particular, exactly the distal end 306 of the main rod 304 corresponds to a brace of a movable structural element subjected to variable loads, such as the already-described element 103.

In general, the length of the rods 304 and 307, the distances between the constraints and the general kinematic configuration of the load compensation device are determined in function of the desired compensation performances and of the energy and bulk constraints of the overall system.

The load compensation device 301 further comprises an elastic element 310, which is configured to provide an elastic force which acts between the second end 309 of the auxiliary rod 307 and the distal end 306 of the main rod 304.

In a preferred embodiment, the elastic element 310 comprises a traction or compression helical spring. In a variant, the elastic element could be a band made of rubber or of an elastic material which is suitable for the purpose.

Preferably, the elastic element 310 is at least indirectly connected to the second end 309 of the auxiliary rod 307.

In a preferred embodiment, such as the one represented in FIG. 3, the elastic element 310 is indirectly connected to the second end 309 of the auxiliary rod 307, in particular, providing a compensating cable 311 which directly connects the second end 309 of the auxiliary rod 307 to the elastic element 310.

Preferably, the elastic element 310 develops axially and is essentially parallel to the main rod 304; thereby, the load compensation device may be more compact and it is possible to insert an elastic element with higher stiffness. The load compensation device 301 further comprises a pulley 312 in proximity of the distal end 306 of the main rod 304, wherein the compensating cable 311 engages the pulley 312.

In a variant, the elastic element 310 could be directly connected to the second end 309 of the auxiliary rod 307, by directly connecting the distal end 306 to the second end 309 being interposed between them, without the need of a compensating cable, as it will be described with reference to FIG. 9.

The load compensation device 301 further comprises a regulation system 313 configured to modify a distance between the second end 309 of the auxiliary rod 307 and the assisted joint 302, so as to vary a preloading of the elastic element 310.

The elastic element 310 is configured to provide an elastic force based on a kinematic configuration taken by the load compensation device 301, so as to compensate the applied load 11 in a component thereof which is transverse to the main rod.

In this sense, the regulation system 313 is preferably configured to minimize a difference between the transverse component of the load 11 to be compensated, and an opposed transverse component provided by the elastic force of the elastic element 310.

The operating principle carried out by the load compensation device 301 is as follows: at any position taken by the user (exoskeleton or robotic arm), suitable control logics, via sensors and processors, process the gravitational torque/force which acts on the assisted joint 302. They thus process the control action to be sent to the regulation system 313 such that the latter will modify the preloading of the elastic element 310 through the articulated system of the arms 304 and 307, such that the compensation force is equal to the one of the gravitational effect.

In particular, the load compensation device 301 further comprises a plurality of sensors (not shown) configured to measure an absolute position of the main rod 304 and further to measure or obtain a torque which stresses the assisted joint 302 as a result of the applied load 11. Furthermore, the load compensation device 301 further comprises at least a processor (not shown) operatively connected to the plurality of sensors and to the regulation system 313, such processor being configured to calculate the preloading of the elastic element 310 so as to counterbalance the torque which stresses the assisted joint.

Preferably, the abovementioned processor is further configured to modulate the elastic force provided by the elastic element 310 in function of a dynamic trajectory which is measured by the plurality of sensors, in order to second a movement which is desired by the user of the exoskeleton or required by the programming of the robot.

It is provided an example of a regulation process which can be carried out at any position taken by the user in the vertical plane, such as the one implemented by the control logics and by the sensors to manage the working cycles of the load compensation device 301.

A single exemplary working cycle can be summarized by the following operation flow:

Sensors provide position measurements and send them to the control logics.

The control logics calculate the position taken by the user and the corresponding gravitational action which acts thereon, expressed as a torque with respect of the reference assisted joint 302. In addition, preferably, the control system processes the movement dynamics and the type of carried-out trajectory.

A processor calculates a deformation which has to be applied to the elastic element 310 in order to obtain a torque which counterbalances the gravitational action.

A processor processes the control action to be sent to the regulation system 313 which allows the desired deformation of the elastic element 310 to be obtained by resolving the kinematics of the articulated system consisting of the rods 304 and 307.

Preferably, such control is designed to modulate the actuation force in function of the trajectory and dynamics imposed by the user while carrying out an activity, so as to second the user intention in an application to an exoskeleton 100.

As already described, the regulation system 313 is configured to modify a distance between the second end 309 of the auxiliary rod 307 and the assisted joint 302, so as to vary a preloading of the elastic element 310. In general, the regulation system 313 is further configured to vary a relative angle between the main rod 304 and the auxiliary rod 307.

For this purpose, the regulation system 313 comprises a movable regulation element 314 associated with the support structure 303.

Preferably, the regulation system 313 further comprises a regulation rod 320 which connects the movable regulation element 314 to the second end 309 of the auxiliary rod 307. Preferably, the movable regulation element 314 comprises a linear actuator 321 onto which the regulation rod 320 is hinged.

Preferably, the linear actuator 321 is movable along a ramp element 322 which is constrained to the support structure 303.

Figure 4A:
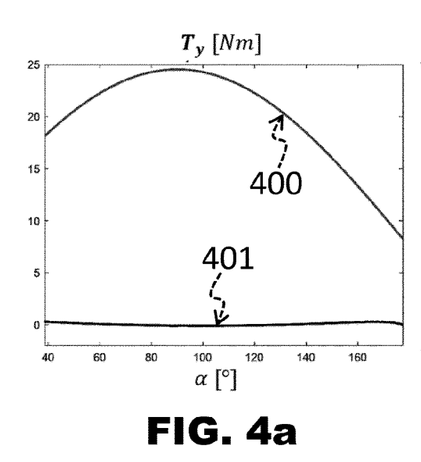
FIG. 4a and FIG. 4b illustrates exemplary performances of a load compensation device according to the present invention.
Figure 4B:
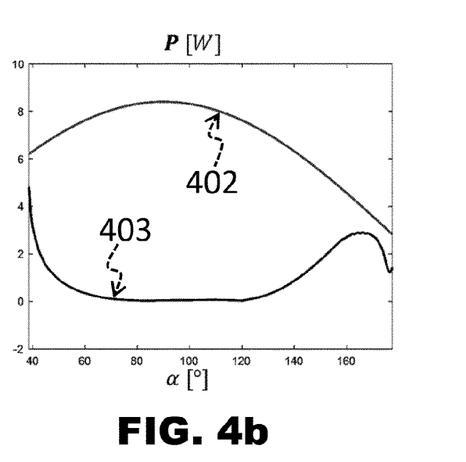

FIG. 4a and FIG. 4b illustrate exemplary performances of a load compensation device according to the present invention.

In particular, FIG. 4a illustrates a comparison between torques at the joint which are required from the user in function of the rotation angle of the main rod 304 around the assisted joint, without the device of the present invention (line 400) and with the load compensation device 301 (line 401).

It can be noted that the effort required from the user is almost completely null in case of using the device (line 401, for any value of the angle).

In particular, FIG. 4b illustrates a different situation, wherein it is assumed that the exoskeleton 100 is equipped with a motor which controls the rotation of the assisted joint 302 instead of the user, by supplying a torque, without the device of the present invention (line 402) and with the load compensation device 301 (line 403).

It can be noted how the total power (calculated by assuming that the angular velocity is constant) in case of exoskeleton 100, which is provided with the load compensation device of the present invention (line 403), is almost null along the entire working field, as compared to the power in case of active exoskeleton with motor but without the device of the present invention (line 402).

The exemplified performances demonstrate that the load compensation device of the present invention is able to almost completely compensate the gravitational effect, in the entire working field, with minimum energy consumptions.

For this reason, the load compensation device of the present invention allows a lighter and less energy-consuming motor to be used, in favor of an overall lighter and more efficient system.

Figure 5:
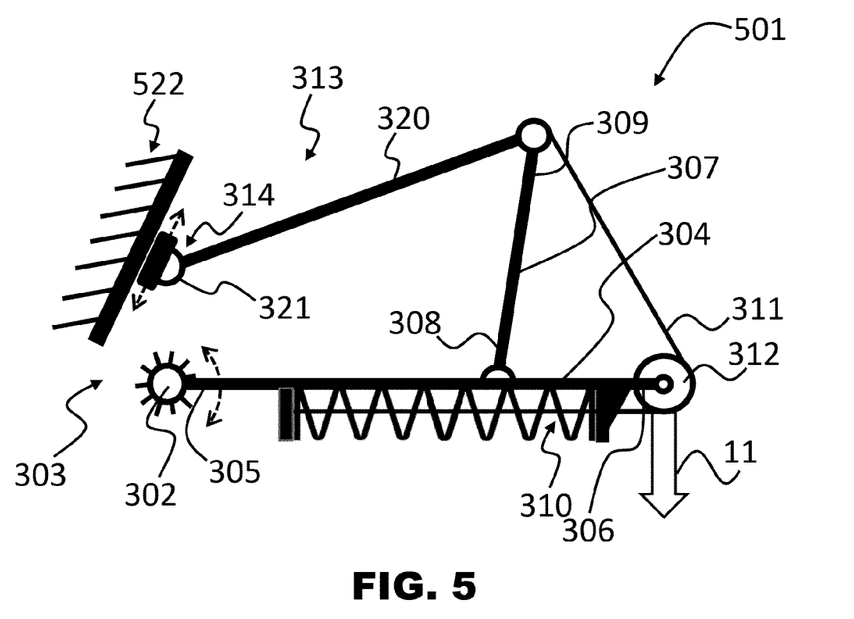
FIG. 5 illustrates a second embodiment of a load compensation device according to the present invention.

FIG. 5 illustrates a second embodiment of a load compensation device 501 according to the present invention.

The load compensation device 501 essentially comprises the elements already described in relation to the embodiment 301 presented with reference to the FIG. 3.

Compared to the already-described embodiment 301, the load compensation device 501 provides different overall geometries implying slightly different kinematic characteristics which allow load compensation suitable for a specific use.

Furthermore, compared to the already-described embodiment 301, the load compensation device 501 provides a linear actuator 321 which is moving on a different ramp element 522, which is differently sloped and is not directly connected to the assisted joint 302, but it is anyway connected to the support structure 303.

In other words, the load compensation device 501 provides a regulation system 313 which always comprises a movable regulation element 314 associated with the support structure 303, and wherein the linear actuator 321 is movable along a different ramp element 522 constrained to the support structure, wherein the ramp element 522 has a determined slope based on different desired kinematic characteristics for the load compensation device 501.

Figure 6:
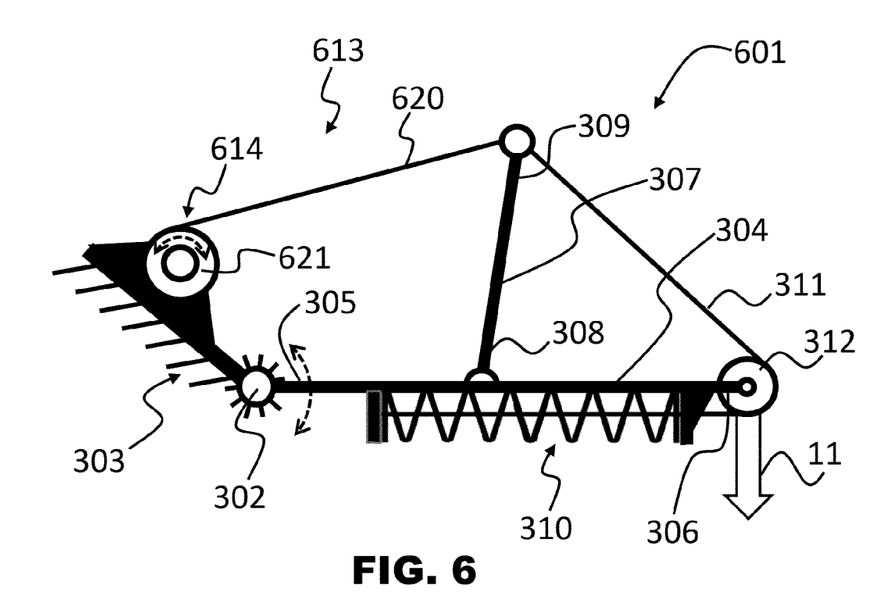
FIG. 6 illustrates a third embodiment of a load compensation device according to the present invention.

The FIG. 6 illustrates a third embodiment of a load compensation device 601 according to the present invention.

The load compensation device 601 essentially comprises the elements already described in relation to the embodiment 301 presented with reference to the FIG. 3.

Therefore, the load compensation device 601 employs the same operating principle described in relation to the previous embodiments 301 and 501, but it uses a different regulation system 613 inside the hybrid mechanical structure.

In particular, the regulation system 613 further comprises a cable 620 which connects the movable regulation element 614 to the second end 309 of the auxiliary rod 307.

In this embodiment of the regulation system 613, the movable regulation element 614 comprises a motor-driven pulley 621 on which the cable 620 is adapted to wind or unwind. Thereby, the regulation system 613 is configured to modify a distance between the second end 309 of the auxiliary rod 307 and the assisted joint 302, so as to vary a preloading of the elastic element 310. In general, the regulation system 613 is further configured to vary a relative angle between the main rod 304 and the auxiliary rod 307.

Preferably, the motor-driven pulley 621 is in a fixed position with respect to the assisted joint 302, and a second distance between the motor-driven pulley 621 and the assisted joint 302 is determined based on desired kinematic characteristics of the load compensation device 601.

In other words, in this embodiment of the regulation system 613, the linear actuator 321 is replaced by a rotary actuator or motor 621, while the regulation rod 320 is replaced by a cable 620 which winds the motor-controlled pulley 621 up.

Figure 7:
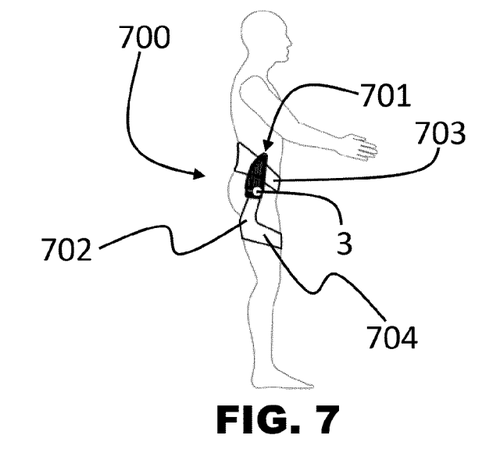
FIG. 7 illustrates an exoskeleton involving pelvis and lumbar spine and comprising a load compensation device according to the present invention.

FIG. 7 illustrates an exoskeleton 700 engaging pelvis and lumbar spine and comprising a load compensation device 701 according to the present invention.

In this embodiment of the load compensation device 701, it is applied to exoskeletons for lumbar spine.

The load compensation device 701 is connected to a support structure 702 onto which the forces are released. The compensation force is transferred from the device 701 to the limb via an element 704, during the motion of the leg imposed by the user around the hinge 3. The element 704 itself preferably contains the electronic components and the power supply batteries of all the active parts, while there are sensors for detecting the relative rotation between 703 and 704.

In general, the load compensation device is associated, in the exoskeleton, to a battery to supply power to the regulation system, a plurality of sensors and at least a processor.

Figure 8:
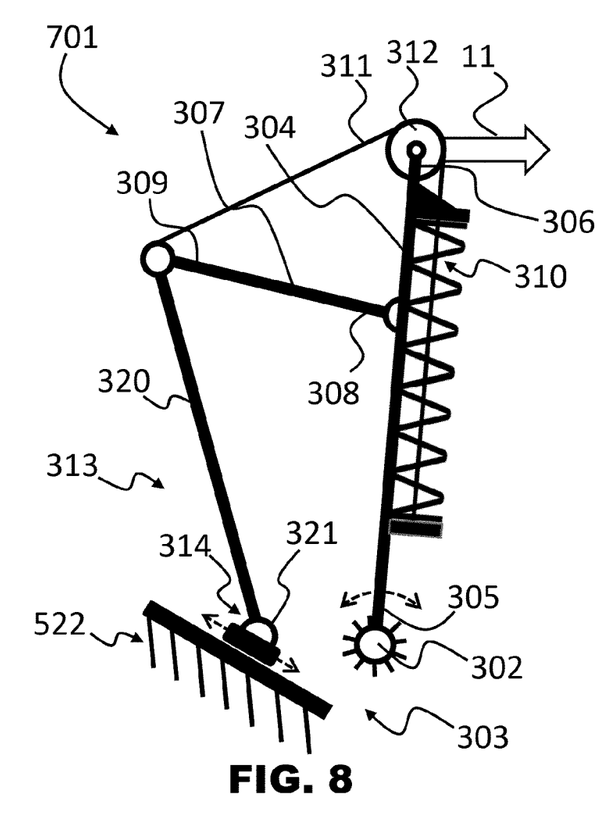
FIG. 8 illustrates a fourth embodiment of a load compensation device according to the present invention.

FIG. 8 illustrates a fourth embodiment of a load compensation device according to the present invention.

The load compensation device 701 is applied to the exoskeleton 700 in order to relieve the effort in the area of the lumbar spine. In this case, the assisted joint 302 is the one of the pelvis. The support structure, on which the load compensation device 701 clasps, is composed of two parts, one which clasps on the upper part of the leg and one which clasps to the pelvis.

The load compensation device 701 follows the same implementation of the already-described load compensation device 501.

Figure 9:
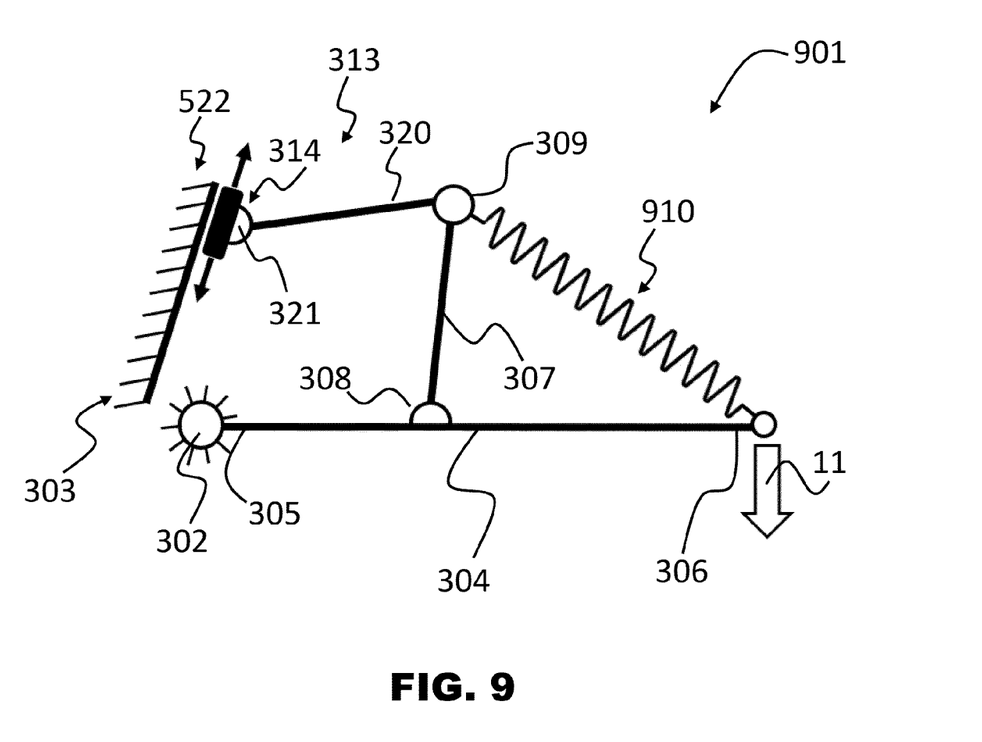
FIG. 9 illustrates a fifth embodiment of a load compensation device according to the present invention.

FIG. 9 illustrates a fifth embodiment of a load compensation device 901 according to the present invention.

The load compensation device 901 comprises some of the elements already described in relation to the embodiments 301 and 501 presented with reference to the FIG. 3 and FIG. 5.

In particular, the load compensation device 901 comprises an assisted joint 302 configured to be constrained to a support structure 303.

The load compensation device 901 further comprises a main rod 304, comprising a proximal end 305, connected to the assisted joint 302, and a distal end 306 configured to be stressed by the applied load 11.

The load compensation device 901 further comprises an auxiliary rod 307 comprising a first end 308 and a second end 309. The first end 308 is hinged on the main rod 304 for rotating the auxiliary rod 307 with respect to the main rod 304. The second end 309 is movable on a plane on which the applied load 11 lies.

The load compensation device 901 further comprises an elastic element 910 configured to provide an elastic force which acts between the second end 309 of the auxiliary rod 307 and the distal end 306 of the main rod 304.

In particular, the elastic element 910 is a tension spring which directly connects the second end 309 with the distal end 306. In a preferred embodiment, the elastic element 910 comprises a helical spring, but it could also be a band made of rubber or of an elastic material which is suitable for the purpose.

In a variant, the tension spring could connect outer portions of rods 304 and 309, without directly connecting their ends.

The load compensation device 901 further comprises a regulation system 313 configured to modify a distance between the second end 309 of the auxiliary rod 307 and the assisted joint 302, so as to vary a preloading of the elastic element 910.

The regulation system 313 preferably corresponds to the embodiment already described with reference to FIG. 5, with a linear actuator 321 which is moving on a ramp element 522.

In general, the elastic element 910 is configured to provide the elastic force based on a kinematic configuration of the load compensation device 901, which is determined by the position of the main rod 304 and the auxiliary rod 307, and by the preloading of the elastic element 910.

In that, the load compensation device 901 is capable of compensating the applied load 11 in a component thereof which is transverse to the main rod 304.

INDUSTRIAL APPLICABILITY

The present invention allows loads to be efficiently compensated, in particular gravitational loads.

The load compensation device according to the present invention can be integrated inside exoskeletons which are particularly designed for industrial applications in which a user has to carry out strenuous manual or generally body-wearing operations, and for both rehabilitation and assistive biomedical applications.

In this sense, the load compensation device according to the present invention, which is integrated in an exoskeleton, allows a load reduction in different joints, such as shoulder, lumbar spine, knee, hip, etc.

Furthermore, the load compensation device according to the present invention can also be integrated into robotic arms.

Considering the description herein reported, the skilled person will be able to conceive further modifications and variations, in order to meet contingent and specific needs.

The embodiments herein described are therefore to be considered as illustrative and non-limiting examples of the invention.

The invention claimed is:

1. A load compensation device comprising:
    an assisted joint associated with a human joint and configured to be coupled to a support structure for engaging an adjacent portion of a human body that includes the human joint;
    a main rod comprising a proximal end connected to said assisted joint, and further comprising a distal end configured to be stressed by an applied load;
    an auxiliary rod comprising a first end and a second end, said first end being hinged on said main rod between the proximal and distal ends for rotating said auxiliary rod with respect to said main rod, said second end being movable on a plane on which said applied load lies;
    an elastic element coupled to said main rod and extending along a length thereof from the distal end to beyond the first end of the auxiliary rod, the elastic element configured to provide an elastic force which acts between said second end of said auxiliary rod and said distal end of said main rod;
    a regulation system comprising
        a ramp coupled to said support structure, a linear actuator movable along the ramp and configured to modify a distance between said second end of said auxiliary rod and said assisted joint, so as to vary a preloading of said elastic element, and a regulation rod hingeably coupled to said linear actuator and to said second end of said auxiliary rod;

wherein said elastic element is configured to provide said elastic force based on a kinematic configuration of said load compensation device, so as to compensate said applied load in a component thereof which is transverse to said main rod.

2. The load compensation device according to claim 1, wherein said regulation system further comprises a cable, which connects said linear actuator to said second end of said auxiliary rod, and wherein said linear actuator comprises a motor-driven pulley for winding or unwinding said cable.

3. The load compensation device according to claim 2, wherein said motor-driven pulley is in a fixed position with respect to said assisted joint, and wherein a second distance between said motor-driven pulley and said assisted joint is determined based on desired kinematic characteristics of said load compensation device.

4. The load compensation device according to claim 1, wherein said regulation system is further configured to vary a relative angle between said main rod and said auxiliary rod.

5. The load compensation device according to claim 1, wherein said regulation system is further configured to minimize a difference between a transverse component of said applied load and an opposed transverse component provided by said elastic force.

6. The load compensation device according to claim 1, further comprising a plurality of sensors configured to measure an absolute position of said main rod and further to measure a torque which stresses said assisted joint as a result of said applied load, and further comprising at least one processor operatively connected to said plurality of sensors and to said regulation system, configured to calculate said preloading in order to counterbalance said torque which stresses said assisted joint.

7. The load compensation device according to claim 6, wherein said processor is further configured to modulate said elastic force as a function of a dynamic trajectory, which is measured by said plurality of sensors, in order to add to a desired movement.

8. The load compensation device according to claim 1, wherein said elastic element is at least indirectly connected to said second end of said auxiliary rod.

9. The load compensation device according to claim 1, further comprising a compensating cable, said compensating cable connecting said second end of said auxiliary rod to said elastic element.

10. The load compensation device according to claim 9, wherein said elastic element develops axially and is essentially parallel to said main rod, said load compensation device further comprising a pulley in proximity of said distal end of said main rod, said compensating cable engaging said pulley.

11. The load compensation device according to claim 1, wherein said auxiliary rod is projecting out of said main rod in a direction opposite to a direction of said applied load.

12. The load compensation device according to claim 1, wherein said distal end of said main rod corresponds to a brace of a movable structural element subject to variable loads.

13. An exoskeleton comprising at least one load compensation device according to claim 1.

14. The exoskeleton according to claim 13, further comprising at least one battery to supply power to said regulation system, and further comprising a plurality of sensors and at least one processor.

* * * * *